April 9, 1957 H. E. SMITH 2,788,248
TAKE-UP DEVICE FOR ENDLESS CRAWLER TREAD ASSEMBLY
Filed May 3, 1955
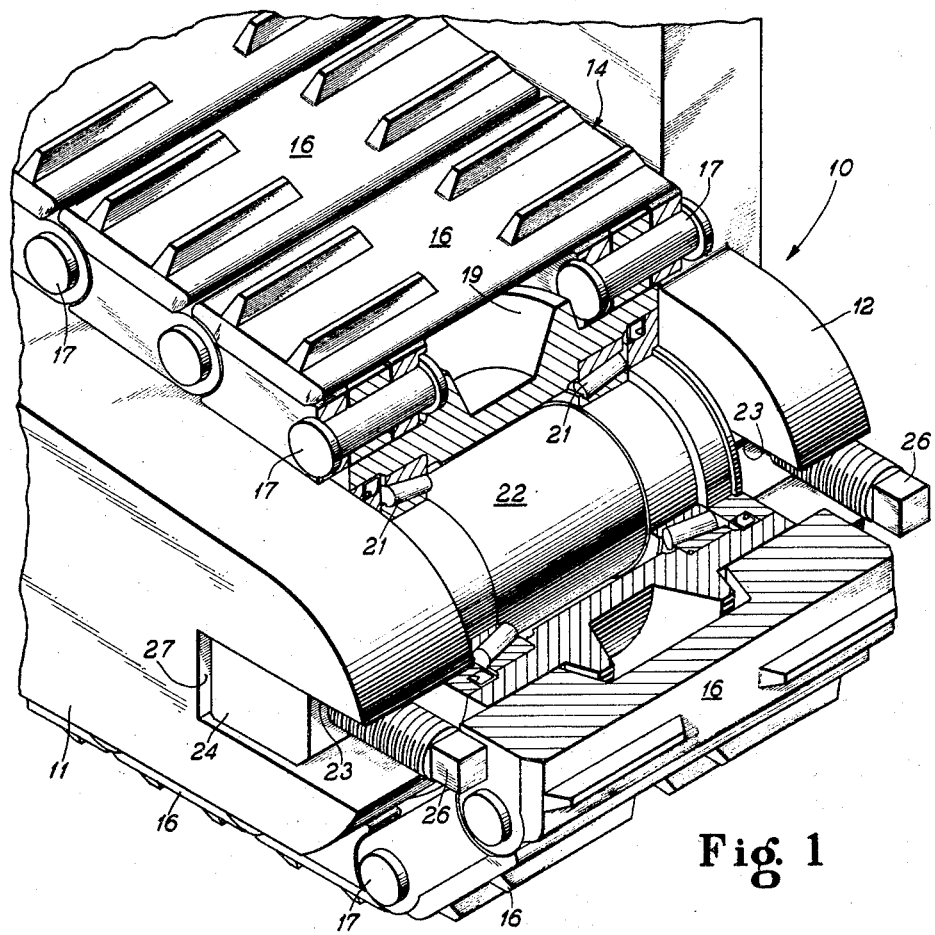
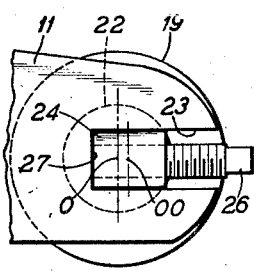 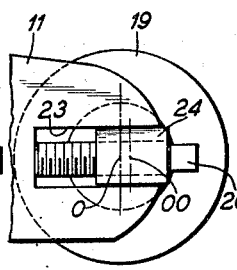 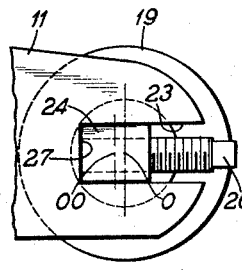 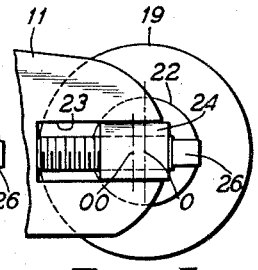
Fig. 2  Fig. 3  Fig. 4  Fig. 5
INVENTOR.
Herman E. Smith
BY
Murray G. Gleeson
ATTORNEY United States Patent Office 2,788,248
Patented Apr. 9, 1957

2,788,248

TAKE-UP DEVICE FOR ENDLESS CRAWLER TREAD ASSEMBLY

Herman E. Smith, Park Forest, Ill., assignor to Goodman Manufacturing Company, Chicago, Ill., a corporation of Illinois Application May 3, 1955, Serial No. 505,740

2 Claims. (Cl. 305—9)

This invention relates generally to crawler treads and more particularly to improvements in arrangements for maintaining the desired degree of slack on the endless crawler tread and for providing a larger range of take-up movement for wear.

It is a principal object of this invention to provide an improved arrangement for taking up the slack in an endless crawler tread.

Other objects and important features of the invention will be apparent from a study of the specification following taken with the drawing which together show a preferred embodiment of the invention and what is now considered to be the best mode of practicing the principles thereof. Other embodiments may be suggested to those having the benefit of the teachings herein, and it is therefore intended that such other embodiments be reserved, especially as they fall within the scope and purview of the appended claims.

In the drawing:

Fig. 1 is a perspective view of an endless crawler tread having the improvements according to the present invention embodied therein;

Fig. 2 illustrates one position of minimum take-up of a tension idler for the crawler tread shown in Fig. 1;

Fig. 3 illustrates a position of maximum take-up for a corresponding position of the idler shaft shown in Fig. 2;

Fig. 4 illustrates a position of minimum take-up of the tension idler when the idler shaft therefor has been rotated to a position 180° from that shown in Fig. 1; and Fig. 5 is a view similar to Fig. 3 showing the position of maximum take-up of the tension idler but for a position of the idler shaft corresponding to Fig. 4.

Referring now to Fig. 1 of the drawing, there is shown an endless crawler tread arrangement indicated generally by the reference numeral 10. The arrangement shown includes a pair of spaced frames 11 and 12 arranged to support and guide the upper and lower runs of an endless crawler tread indicated generally by the reference numeral 14. The endless crawler tread 14 consists of a series of crawler tread pads 16 pivotally interconnected by track pins 17 in a manner well known in the art.

As seen in Fig. 1 the endless crawler tread is reversed in direction about an idler 19 arranged to turn upon spaced bearings 21 supported on an idler shaft 22. A drive sprocket at the opposite end is not shown. Each of the frames 11 and 12 is provided with a longitudinal slot 23 in the end thereof, and the ends of the idler shaft 22 are of a rectangular cross section as at 24 so as to slide in the slots 23.

The spacing of the idler shaft 22 from the driving sprocket (not shown) at the opposite end of the crawler assembly is adjusted by screws 26 threadably engaged with the shaft ends 24 and bearing against the inner end or bottoms 27 of the slots 23.

In the normal case, where the idler 19 is concentric with the shaft 22, the latter would have a range of adjustment determined by the depth of the slot 23. However, this range of adjustment is often not enough and it is the purpose of this invention to provide added range of movement of the idler shaft.

In order to provide such extra movement of the idler shaft 22 and the idler 19, the shaft ends 24 are located eccentrically of the turning center of the idler roller 19.

In Fig. 2 there is shown the position of the idler shaft for minimum take-up of the crawler tread. Point 0 represents the center of rotating movement of the idler 19, while 00 represents the geometrical midpoint of the end 24. The outer limit of the range of movement of the shaft 22 and idler 19 in this position of the shaft end 24 is shown in Fig. 3.

In Fig. 4, point 0 again represents the position of the turning center of the idler 19, while 00 again represents the geometrical center of the stub extension 24 when it has been turned through 180° relative its position as seen in Figs. 1 and 2.

Fig. 5 shows the outer limit of the range of movement of the idler 19 when the shaft is turned 180° as shown in Fig. 4.

It will thus be seen that the overall maximum amount of adjustment of the idler 19 is equal to the range of movement of the stub extension 24 within the slot 23 plus twice the amount of eccentricity 0–00.

While the invention has been described in terms of a preferred embodiment thereof its scope is intended to be limited only by the claims here appended.

I claim as my invention:

1. An endless crawler tread assembly comprising a pair of spaced frame members, an endless crawler tread mounted for orbital movement about said frame members, an idler mounted at one end of said frame members for reversing the runs of said crawler tread, and means for bodily shifting said idler longitudinally of said frame members to maintain predetermined slackness in said crawler tread comprising: longitudinally extending slideways in said frame members; a transverse shaft supporting said idler for rotation about a transverse axis; a slide block in each of said ways and constructed for disposition about a transverse axis in either of two positions which are diametrically opposed to each other; said shaft being supported by and between said blocks; each of said slide blocks having two faces spaced at different distances from a vertical plane including the axis of rotation of said idler, said faces being selectively engageable with the corresponding frame member at one end of said slideways upon diametrical re-disposition within said slideways to thereby vary the range of movement of said idler between two positions to change the slackness in said crawler tread by amounts totaling the length of movement in said slideways of said blocks plus twice the distance from said rotational axis to a point midway of said two faces.

2. An endless crawler tread assembly in accordance with claim 1 in which there is auxiliary adjusting means effective to move the slide blocks relative to the frame members for providing a range of adjustment for each of the two diametrical dispositions of the slide blocks within the ways.

References Cited in the file of this patent

UNITED STATES PATENTS

| | | |
|---|---|---|
| 1,392,417 | Hicks | Oct. 4, 1921 |
| 1,656,899 | Best | Jan. 24, 1928 |
| 1,995,744 | Clark | Mar. 26, 1935 |
| 2,466,029 | Knox et al. | Apr. 5, 1949 |